Nov. 21, 1967 — A. P. WATERSON — 3,353,288
LAND LEVELER
Filed Feb. 17, 1965 — 2 Sheets-Sheet 1
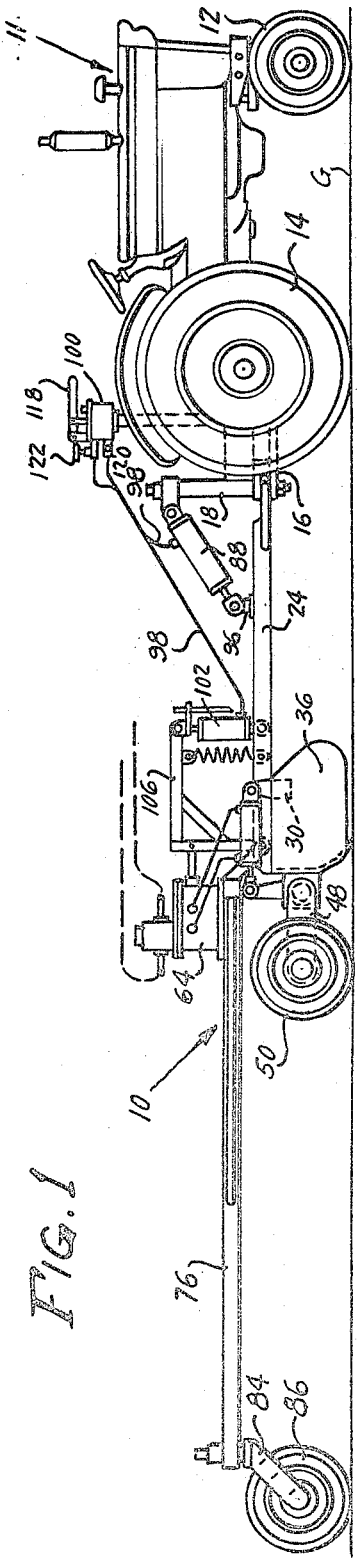
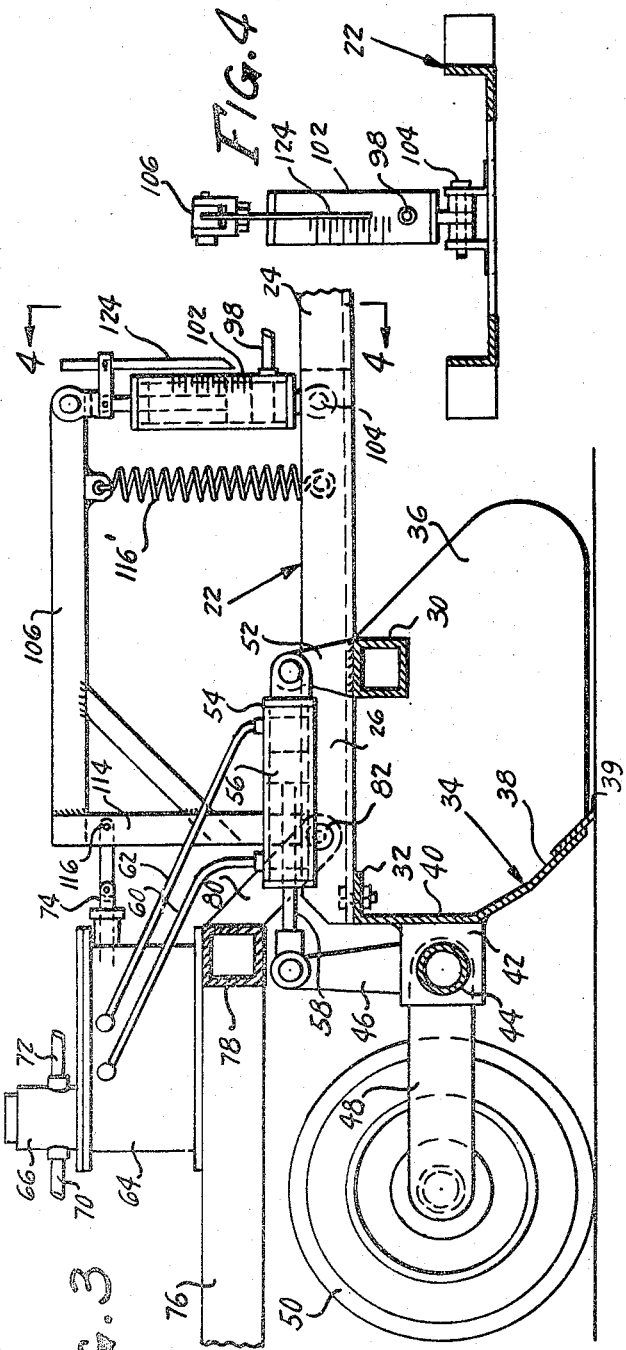
INVENTOR.
ARTHUR P. WATERSON
BY *Kimmel, Crowell & Weaver*
ATTORNEYS.

Nov. 21, 1967  A. P. WATERSON  3,353,288
LAND LEVELER

Filed Feb. 17, 1965  2 Sheets-Sheet 2

INVENTOR.
ARTHUR P. WATERSON

BY *Kimmel, Crowell & Weaver*
ATTORNEYS.

United States Patent Office 3,353,288
Patented Nov. 21, 1967

3,353,288
LAND LEVELER
Arthur P. Waterson, Box 415, Dighton, Kans. 67839
Filed Feb. 17, 1965, Ser. No. 433,305
6 Claims. (Cl. 37—180)

ABSTRACT OF THE DISCLOSURE

A tractor drawn implement having a blade adapted for ground engagement to scrape the ground to a predetermined depth and including a wheel mounted frame on which the blade is mounted for vertical adjustment and wherein the frame is provided with a rear ground level feeler wheel, the front wheels of the tractor serve as front ground feeler wheels, and a hydro-mechanical system is provided to automatically maintain the cutting edge of the blade substantially in the plane containing the points of tangency of the feeler wheels in their ground engaging positions, and wherein the hydro-mechanical control system includes hydraulic actuator means fixedly connected on the drawbar of the tractor and becomes operable to effect operation of the hydro-mechanical blade adjustment means upon vertical pivotal movement of the sensing wheels relative to the axis of the rear wheels of the tractor.

The present invention relates to a land leveler and more particularly to the provision of an improved tractor drawn scraper blade having automatically actuated means for varying the height of the blade in accordance with the contour of the ground.

It is an object of the present invention to provide a device that is adapted for fine work in leveling minor protuberances and humps in ground to be leveled after the coarse leveling has been accomplished in the usual manner.

Another object of the present invention is to provide a land leveler having at least one rear feeler wheel and front wheel feeler means for the land leveler which, in this given case, comprises the front wheels of the tractor vehicle.

It is another object of the present invention to provide a land leveler with hitch or frame means (hereinafter referred to as "frame" means) pivotally secured to the draw bar of the tractor for pulling the scraper blade, and ram means pivotally connected to the frame means and to a bearing which is located on upright means connected to the tractor draw bar which ram means are operatively connected to control means for maintaining alignment of the front and rear feeler wheels and the cutting edge of the scraper's blade to effect leveling of the land over which the tractor and blade travel.

It is still a further object of the present invention to provide a land leveler in which the front wheels of a conventional tractor which pulls the scraper blade acts as the front feeler for the leveler when the tractor traverses uneven ground so as to cause the draw bar to raise and lower, and to cause an upright member rigidly connected to the draw bar to tilt forwardly or backwardly to cause a ram to extend or contract which operates through a closed circuit to operate a vertical ram thereby manipulating a pivoted arm which in turn operates a cam rod to operate the conventional servo-valve mechanism that controls the scraper's height to hold correct alignment with front and rear feeler wheels, this causes the scraper assembly to cut and fill, thereby leveling the land.

Various other objects and advantages of the present invention will be readily apparent from the following detailed description when considered in connection with the accompanying drawings forming a part hereof and in which:

FIGURE 1 is a side elevational view of the present invention.

FIGURE 2 is a top plan view of the invention.

FIGURE 3 is an enlarged view taken along the lines 3—3 of FIGURE 2.

FIGURE 4 is a view taken along the lines 4—4 of FIGURE 3.

FIGURE 5 is an enlarged view taken along the lines 5—5 of FIGURE 2.

FIGURE 6 is an enlarged view taken along the lines 6—6 of FIGURE 2.

Referring to the drawings, the reference numeral 10 generally designates the land leveler of the present invention which is adapted to be attached to a conventional tractor 11 which includes front wheels 12 and rear wheels 14, and a draw bar 16 attached to the rear of the tractor. The draw bar has a vertical or upright member 18 rigidly attached thereto and pivotally attached to the frame 22. The frame 22, as best seen in FIGURE 2, comprises two diagonal members 24 with their rear portions 26 extending parallel to the axis of the path of travel of the tractor. The frame and particularly diagonal members 24 are here shown as being made of angle iron, although the same could comprise box frame members, if desired. The frame is further provided with a plurality of transverse cross members 28.

The rear portion 26 of the frame is provided with two cross members 30 and 32 which extend beyond the opposite sides of the portions 26. The cross member 30 is box shaped while the member 32 is flat and has a scraper blade 34 secured thereto. The blade 34 has guide wings 36 on opposite sides thereof and the blade and guide wings are rigidly secured to the frame by bolts or other suitable means.

The blade 34 is provided with a lower arcuate or inclined section 38 having a cutting edge 39 and an upper vertical section 40. Two spaced block members 42 have their front ends welded to the upper section 40. A transversely extending tubular member 44 is pivoted through openings in the block members 42 and has welded to the top thereof a vertical arm 46. A wheel support arm 48 is fixed to the member 44 and carries a wheel 50. It will be noted that the member 44 is provided with identical wheel support arms and wheels on the opposite ends thereof as best seen in FIGURE 2.

The box member 30 is provided with an upstanding or upright ear or arm 52 and has the forward end of a hydraulic cylinder 54 pivotally connected thereto. The cylinder 54 is double acting and is provided with a piston 56 therein whose piston rod 58 extends out of the rear end of the cylinder and is pivotally connected to the vertical arm 46. The opposite ends of the cylinder 54 are in communication through hydraulic supply lines 60 and 62 with a servo motor 64. The servo motor or servo device 64 is powered by a hydraulic motor 66 connected by hydraulic lines 70 and 72 to the tractor hydraulic system. The servo unit consists of a pressure sensitive variable delivery pump, a servo valve, cam operated, and a counterbalance or locking valve. This unit utilizes the same principle of operation as described in my United States Patent No. 3,103,078, filed Dec. 12, 1962, Ser. No. 243,081, which issued on Sept. 10, 1963, entitled "Land Leveler," and which is now well-known in the art. The servo unit is utilized to supply hydraulic fluid to the double-acting piston 54 by operation of the cam rod 74, as best seen in FIGURE 3.

The servo device 64 is fixed on a rear beam 76 secured adjacent its front to a rigid box member 78 to which are secured by welding two spaced diagonal members 80 pivotally connected by pins 82 to the rear portions 26 of the frame 22. The rear of the beam 76 is provided with a rear wheel support member 84 suitably swivelly connected thereto by any suitable means. The support member 84 carries a rear wheel 86.

Referring to FIGURES 1 and 5, a hydraulic ram 88 is pivotally connected to a bearing 90 disposed on the vertical or upright member 18. The ram 88 is inclined and a single-acting piston 92 is disposed therein with the piston rod 94 being pivotally connected to a lug 96 secured to frame 22. The bearing 90 permits the tractor to turn to the left or right without doing any damage to the ram 88 pivotally connected thereto.

A hydraulic line 98 communicates with the front upper end of the ram 88 and a hand pump 100 on the rear of the tractor and a vertical cylinder or ram 102. The lower end of the ram 102 is pivotally connected as at 104 to the frame 22 while the upper end is pivotally connected to an L-shaped arm 106 having its lower rear end pivotally connected at 110 to a longitudinal pair of brace members 112 forming part of the frame 22.

The vertical leg 114 of the L-shaped arm 106 has its upper end pivotally connected as indicated at 116 to the cam rod 74. The cam rod 74 is, of course, connected operably with the servo-valve to control the supply of hydraulic liquid through the lines 60 and 62 to the cylinder 54 in accordance with the teachings of my patent to which reference has been made supra.

In accordance with the present invention the land leveler operates by utilizing the tractor's front wheels which represent the front feeler element, to sense travel of the wheels over uneven ground. This traverse of the front wheels over uneven ground will cause the draw bar 16 to raise and lower, and also cause the upright or vertical member 18 to tilt forwardly or backwardly to cause the ram 88 to extend or contract, and to accept or force oil through line 98 into or out of the cam control ram 102, which is in communication with the cylinder 88 through the line 98. The action or operation of the ram 102 will operate the L-shaped arm 106 pivoted at 110, as best seen in FIGURE 2, to operate the cam rod 74 and to actuate the servo unit 64 by well known means. The movement of the piston 56 in the cylinder 54 will be transmitted through the piston rod 58 and the vertical arm 46 to rotate the tubular member 44 which will move the wheel support arm 48 therewith so as to raise or lower the scraper blade 34, and consequently its cutting edge 39 to maintain the alignment (see FIGURE 1) of the scraper blade cutting edge 39 and the points of the tangential engagement of the front and rear feeler wheels 12, 86, respectively, in a common ground plane such as is indicated by reference letter G.

The tension in the spring 116 plus the weight of the arm 106 will cause the ram 88 to act as a power source since the ram 88 and the line 98 and the ram 102 are full of oil under pressure.

The hydraulic hand pump 100 is operated by a handle 118 to force oil into line 98 through a check valve 120. The added oil will cause the ram 102 to be extended to cause the servo system to raise the scraper blade and its cutting edge upwardly to any new adjusted position, or it may also be pumped up to full transport position. If the scraper is to be lowered the valve 122 would be opened slightly to allow the oil in the line 98 to flow back into the reservoir of the hand operated pump and the valve 122 would be closed when the pointer 124 has reached the zero point at the ram 102.

From the foregoing it will now be seen that there is provided an improved land leveler, which accomplishes all the objects of this invention, and others, including many advantages of great practical utility and commercial importance. It is to be understood that all matters herein are to be interpreted merely as illustrative and not in a limiting sense as there may be many modifications made within the spirit and scope of the invention described and shown herein.

What is claimed is:

1. A land leveler comprising, in combination with a tractor having front and rear wheels, a drawbar, a horizontal frame, an upright member pivotally attaching the frame to said drawbar, a scraper blade rigidly connected to the rear of said frame and depending therefrom, said scraper blade having a lower cutting edge, wheel and wheel support means pivotally connected on said scraper blade, a first ram pivotally connected to said frame and upright member, an L-shaped arm pivotally connected to said frame, a second ram pivotally connected to said arm and frame, hydraulic supply conduit means in communication with both of said rams for actuating said arm about its pivot point, a cam rod operatively connected to said arm for movement thereby, a beam pivotally connected on said frame and extending rearwardly therefrom, a ground engaging feeler wheel mounted on said beam on the rear end thereof, servo-unit means mounted on said beam and operatively connected for actuation by said cam rod, double acting hydraulic cylinder scraper blade actuating means operatively connected to said wheel support means to effect pivotal movement of its said wheel means for maintaining the cutting edge of said scraper blade in alignment between said tractor front wheels and said ground engaging feeler wheel, causing the scraper blade to cut and fill, thereby leveling the land, and hydraulic conduit means in communication with said servo-unit and double acting hydraulic cylinder means for controlling said scraper blade.

2. The leveler of claim 1 wherein said first ram is inclined upwardly with its front end secured to a bearing disposed on said upright.

3. The leveler of claim 2 wherein said second ram is vertically disposed and said L-shaped arm is inverted, and spring means urge the front end of said arm toward said frame.

4. The leveler of claim 3 wherein block members are fixed to said blade, a transverse arm is rotatably carried in said block members, an upright member is fixed to said transverse arm, said wheel support means comprise wheel support arms fixed to said transverse arm, and said wheel means is carried by said wheel support arms, and said double acting hydraulic cylinder blade actuating means is pivotally connected to said upright member.

5. The leveler of claim 4 wherein hand pump means with a check valve and a bleed valve communicate with said hydraulic conduit supply means for adjusting the height of the scraper blade.

6. A land leveler comprising, in combination with a tractor having front and rear wheels, a drawbar, a horizontal frame, an upright member pivotally attaching the frame to said drawbar, a scraper blade rigidly connected to the rear of said frame and depending therefrom, said scraper blade having a lower cutting edge, wheel and wheel support means pivotally connected on said scraper, a first ram pivotally connected to said frame and upright member, an arm pivotally connected to said frame, a second ram pivotally connected to said arm and frame, hydraulic supply conduit means in communication with both of said rams for actuating said arm about its pivot point, a rod operatively connected to said arm for movement thereby, a beam pivotally connected on said frame and extending rearwardly therefrom, a ground engaging feeler wheel mounted on said beam at the rear end thereof, servo-unit means mounted on said beam and operatively connected for actuation by said rod, double acting hydraulic cylinder scraper blade actuating means operatively connected to said wheel support means to effect pivotal movement of its said wheel means for maintaining the cutting edge of said scraper blade in alignment between said tractor front wheels and said ground engaging feeler wheel, causing the scraper blade to cut and fill, thereby leveling the land, and hydraulic conduit means in communication with said servo-unit and double acting hydraulic cylinder means for controlling said scraper blade.

References Cited

UNITED STATES PATENTS

| | | |
|---|---|---|
| 2,732,640 | 1/1956 | Kirchner. |
| 2,792,651 | 5/1957 | Hobday _____ 37—180 |
| 3,032,902 | 5/1962 | Shumaker _____ 37—180 |
| 3,034,239 | 5/1962 | Waterson. |
| 3,103,078 | 9/1963 | Waterson. |

ABRAHAM G. STONE, *Primary Examiner.*

R. L. HOLLISTER, *Assistant Examiner.*